United States Patent
Michailovski et al.

(10) Patent No.: US 12,180,341 B2
(45) Date of Patent: Dec. 31, 2024

(54) COLLECTORS FOR FLOTATION PROCESS

(71) Applicant: BASF SE, Ludwigshafen am Rein (DE)

(72) Inventors: Alexej Michailovski, Ludwigshafen (DE); Anna Maria Mueller-Cristadoro, Lemfoerde (DE); Maria Escoda Maregenat, Barcelona (ES)

(73) Assignee: BASF SE, Ludwigshafen am Rhein (DE)

( * ) Notice: Subject to any disclaimer, the term of this patent is extended or adjusted under 35 U.S.C. 154(b) by 376 days.

(21) Appl. No.: 17/614,839

(22) PCT Filed: Jun. 1, 2020

(86) PCT No.: PCT/EP2020/065107
§ 371 (c)(1),
(2) Date: Nov. 29, 2021

(87) PCT Pub. No.: WO2020/245068
PCT Pub. Date: Dec. 10, 2020

(65) Prior Publication Data
US 2022/0227936 A1    Jul. 21, 2022

(30) Foreign Application Priority Data
Jun. 6, 2019 (EP) .................................. 19382464

(51) Int. Cl.
C08G 73/24    (2006.01)
B03D 1/01    (2006.01)
B03D 1/016    (2006.01)
C08G 73/02    (2006.01)

(52) U.S. Cl.
CPC .............. C08G 73/024 (2013.01); B03D 1/01 (2013.01); B03D 1/016 (2013.01); *B03D 2201/02* (2013.01)

(58) Field of Classification Search
USPC ......................................................... 528/332
See application file for complete search history.

(56) References Cited

U.S. PATENT DOCUMENTS

| 2,173,909 | A | 9/1939 | Kritchevsky |
| 4,348,287 | A | 9/1982 | Jenkins |
| 2011/0011806 | A1 | 1/2011 | Ebert et al. |
| 2011/0168064 | A1 | 7/2011 | Jahnsen et al. |
| 2018/0251603 | A1 | 9/2018 | Gillet et al. |

FOREIGN PATENT DOCUMENTS

| WO | WO-9726995 A1 * | 7/1997 | ........... B03D 1/0043 |
| WO | WO-2009/047269 A2 | 4/2009 | |
| WO | WO-2009/060060 A1 | 5/2009 | |
| WO | WO-2009/112379 A1 | 9/2009 | |
| WO | WO-2011147855 A2 * | 12/2011 | ........... B03D 1/0043 |

OTHER PUBLICATIONS

Description WO9726995A1 Translated (Year: 1997).*
European Search Report for EP Patent Application No. 19382464.6, Issued on Jan. 10, 2020, 3 pages.
International Search Report for PCT Patent Application No. PCT/EP2020/065107, Issued on Aug. 13, 2020, 4 pages.

* cited by examiner

*Primary Examiner* — Terressa Boykin
(74) *Attorney, Agent, or Firm* — Faegre Drinker Biddle & Reath LLP

(57) ABSTRACT

The present invention relates to the flotation of non-sulfidic minerals and ores. Particularly the present invention relates to a collector for the beneficiation of non-sulfidic minerals and ores.

15 Claims, No Drawings

COLLECTORS FOR FLOTATION PROCESS

FIELD OF THE INVENTION

The present invention relates to the flotation of non-sulfidic minerals and ores. Particularly the present invention relates to a collector for the beneficiation of non-sulfidic minerals and ores.

BACKGROUND OF THE INVENTION

Froth flotation is used for beneficiating ores. In particular, froth flotation can be used to separate valuable minerals in an ore from their associated gangue, or for separating the valuable minerals from one another. Froth flotation typically involves mixing an aqueous slurry containing finely ground ore particles with a frothing or foaming agent to produce a froth. Ideally, ore particles that contain the desired mineral are preferentially attracted to the froth because of an affinity between the froth and the exposed mineral on the surfaces of the ore particles. The resulting beneficiated minerals are then collected by separating them from the froth. The ability of a mineral to float is related to its surface properties. Chemical reagents known as "collectors" are used to modify surface properties of minerals, and may be added to the slurry to increase the selectivity and efficiency of the separation process.

In reverse flotation, impurities are floated out of the mineral of value. In particular, iron ore, calcium carbonate, phosphate and feldspar are frequently refined in this manner. In many cases, minerals containing silicates are the main component of these impurities, which cause reductions in quality of the end product. In addition to quartz, mica and feldspar, these also include muscovite and biotite. For example, a high silicate content reduces the quality of iron ore concentrate and so this concentrate is purified by flotation, for example in Brazil, by using alkyl ether amines and alkyl ether diamines, in order to be able to produce high-value steels from the low-silicate concentrate.

Calcium carbonate is purified from silicate-containing and coloring minerals using quaternary ammonium salts based on fatty acids or fatty alkyl imidazoline compounds in a reverse flotation process. Since calcium carbonate, in addition to kaolin, rutile and talc is used as a white pigment in papermaking and plastics production, a degree of whiteness as high as possible or a low concentration of coloring minerals is desirable. Owing to the hardness of silicate, in printing, its presence would also lead to increased wear on the dies of the printing machines. Therefore, calcium carbonate, in addition to dry refining, is purified by the flotation process.

In general, attempts are made by means of reverse flotation to reduce the silicate content, which in the case of calcium carbonate is frequently characterized as acid-insoluble component, below 1.0% by weight. The silicate content in the feed can vary and can sometimes be 10 to 20% $SiO_2$ by weight.

A number of amine-based monomeric collectors are used in the reverse flotation process for the beneficiation of iron ore, phosphates, calcite and other minerals. The common amine based-monomeric collectors used in this process are unselective for fine particle size ranges. The polymeric polycondensate based collectors exhibit the desired selectivity, but are required in large quantities.

Thus, there is a need to provide novel polymeric polycondensate based collectors which show a selectivity that is similar or even better than the selectivity of conventionally used collectors, but can be used in comparatively lower amounts.

SUMMARY OF THE INVENTION

Surprisingly, it was found that the modified polyetheramine of the present invention, when used in a collector composition, show a selectivity that is similar or even better than the selectivity of conventionally used collectors, but can be used in comparatively lower amounts.

Thus, in a first aspect, the presently claimed invention is directed to a modified polyetheramine wherein the modified polyetheramine comprises the repeating unit of formula (I)

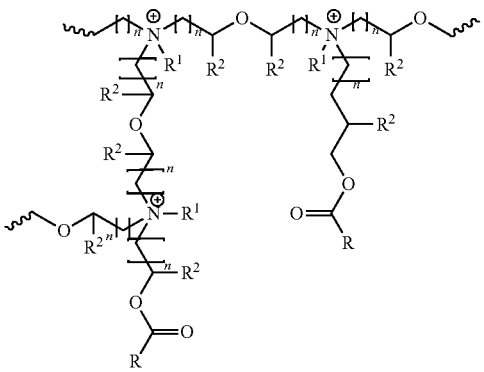

wherein,
R is a linear or branched aliphatic radical containing 6 to 22 carbon atoms and 0, 1, 2 or 3 double bond(s),
$R^1$ is H or linear or branched C1-C3 alkyl,
$R^2$ is H or linear or branched C1-C6 alkyl and
n is, identical or different, an integer in the range from $\geq 1$ to $\leq 4$.

In a second aspect, the presently claimed invention is directed to a process for manufacturing the modified polyetheramine comprising repeating units of formula (I), whereby the process comprising reacting at least one polyetheramine polyol containing at least one hydroxyl group with at least one fatty acid and further modifying by quaternization with hydrogen or at least one C1-C3 alkyl group.

In a third aspect, the presently claimed invention is directed to the use of the modified polyetheramine as described herein as a collector for the beneficiation of non-sulfidic minerals and ores.

In a fourth aspect, the presently claimed invention, is directed to a reverse flotation process for the beneficiation of non-sulfidic minerals and non-sulfidic ores by collection of impurities from non-sulfidic minerals and non-sulfidic ores in the froth, comprising the steps of:
a) mixing the non-sulfidic minerals and non-sulfidic ores in water to obtain an aqueous mixture,
b) adjusting the pH of the aqueous mixture obtained in step a) to a desired level to obtain a pH adjusted aqueous mixture,
c) optionally, adding a depressant to the aqueous mixture,
d) adding the at least one modified polyetheramine according to any of the invention to the pH adjusted aqueous mixture, e) agitating the pH adjusted aqueous mixture obtained in step d) under air injection to generate froth, f) collecting impurities in the froth, and g) recovering the non-sulfidic minerals and non-sulfidic ores.

DETAILED DESCRIPTION OF THE INVENTION

Before the present compositions and formulations of the presently claimed invention are described, it is to be understood that this invention is not limited to particular compositions and formulations described, since such compositions and formulation may, of course, vary. It is also to be understood that the terminology used herein is not intended to be limiting, since the scope of the presently claimed invention will be limited only by the appended claims.

If hereinafter a group is defined to comprise at least a certain number of embodiments, this is meant to also encompass a group which preferably consists of these embodiments only. Furthermore, the terms 'first', 'second', 'third' or 'a', 'b', 'c', etc. and the like in the description and in the claims, are used for distinguishing between similar elements and not necessarily for describing a sequential or chronological order. It is to be understood that the terms so used are interchangeable under appropriate circumstances and that the embodiments of the presently claimed invention described herein are capable of operation in other sequences than described or illustrated herein. In case the terms 'first', 'second', 'third' or '(A)', '(B)' and '(C)' or '(a)', '(d)', 'ii' etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

Furthermore, the ranges defined throughout the specification include the end values as well i.e. a range of 1 to 10 implies that both 1 and 10 are included in the range. For the avoidance of doubt, applicant shall be entitled to any equivalents according to applicable law.

In the following passages, different aspects of the presently claimed invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to 'one embodiment' or 'an embodiment' means that a particular feature, structure or characteristic described in connection with the embodiment is included in at least one embodiment of the presently claimed invention. Thus, appearances of the phrases 'in one embodiment' or 'in an embodiment' in various places throughout this specification are not necessarily all referring to the same embodiment but may.

Furthermore, the particular features, structures or characteristics may be combined in any suitable manner, as would be apparent to a person skilled in the art from this disclosure, in one or more embodiments. Furthermore, while some embodiments described herein include some, but not other features included in other embodiments, combinations of features of different embodiments are meant to be within the scope of the presently claimed invention, and form different embodiments, as would be understood by those in the art.

For example, in the appended claims, any of the claimed embodiments can be used in any combination.

As used herein, the term "flotation" relates to the separation of minerals based on differences in their hydrophobicity and their different ability to adhere or attach to air bubbles. The aim of flotation as mineral processing operation is to selectively separate certain materials. Flotation comprises froth flotation methods like for example direct flotation or reverse flotation. Direct flotation of non-sulfidic minerals or ores refers to methods, wherein particular non-sulfidic minerals or ores are collected in the froth and the impurities remain in the slurry. Reverse flotation or inverse flotation of non-sulfidic minerals or ores relates to methods, wherein the impurities as undesired materials are collected in the froth and the non-sulfidic minerals or ores remain in the slurry as cell product.

As used herein, the term "cell product" has the similar meaning as cell underflow or slurry and means the product remaining in the cell in particular in reverse flotation processes.

As used herein, the term "froth product" means the product obtained in the froth in particular in direct flotation processes.

As used herein, the term "concentrate" has the meaning of flotation product and refers to the material obtained as cell product (valuable material) in reverse flotation processes as well as to froth product as the material obtained in the froth (valuable material) in direct flotation processes.

As used herein, the term "tailings" or "flotation tailings" is understood economically and means the undesired products and impurities which are removed in direct or reverse flotation processes.

As used herein, the term "collector" relates to substances with the ability to adsorb to a mineral particle and to make the ore particle hydrophobic in order to enable the ore particle to attach to air bubbles during flotation. The collector may comprise, for example at least one or two or three different collectors. A collector composition may comprise collector components which are named for example primary, secondary, ternary collector and can influence the collector composition properties. The collectors can in particular be surface-active, can have emulsification properties, can act as wetting agent, can be a solubility enhancer and/or a foam or froth regulator.

As used herein, the term "grade" relates to the content of the desired mineral or valuable or targeted material in the obtained concentrate after the enrichment via flotation.

As used herein, the term "recovery" refers to the percentage of valuable material recovered after the enrichment via flotation. The relationship of grade (concentration) vs. recovery (amount) is a measure for the selectivity of froth flotation. The selectivity increases with increasing values for grade and/or recovery. With the selectivity the effectiveness/performance of the froth flotation can be described.

Modified Polyetheramine

Product

In an embodiment of the presently claimed invention, the modified polyetheramine comprises repeating units of formula (I), formula (I)

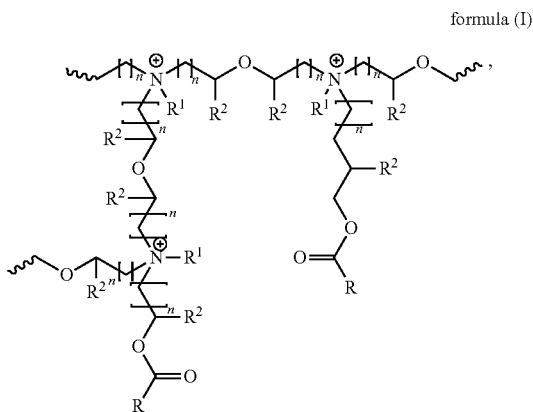

wherein,
R is a linear or branched aliphatic radical containing 6 to 22 carbon atoms and 0, 1, 2 or 3 double bond(s),
$R^1$ is H or linear or branched C1-C3 alkyl,
$R^2$ is H or linear or branched C1-C6 alkyl and
n is, identical or different, an integer in the range from ≥1 to ≤4.

In one embodiment, R is a linear or branched aliphatic radical containing 6 to 22 carbon atoms and 0, 1, 2 or 3 double bond(s). Linear or branched aliphatic radicals containing 6 to 22 carbon atoms include linear or branched C6-C22 alkyl, linear or branched C6-C22 alkenyl and linear or branched C6-C22 alkinyl.

In one embodiment, the linear or branched aliphatic radicals including linear or branched C6-C22 alkyl, linear or branched C6-C22 alkenyl and linear or branched C6-C22 alkinyl, C1-C3 alkyl and C1-C6 alkyl are unsubstituted or substituted, preferably the linear or branched aliphatic radicals including linear or branched C6-C22 alkyl, linear or branched C6-C22 alkenyl and linear or branched C6-C22 alkinyl, C1-C3 alkyl and C1-C6 are unsubstituted.

In one embodiment, R is unsubstituted linear C6-C22 alkyl which is selected from the group consisting of heptyl, octyl, nonyl, decyl, undecyl, dodecyl, tridecyl, tetradecyl, pentadecyl, hexadecyl, heptadecyl, octadecyl, nonadecyl and eicosyl.

In one embodiment, R is unsubstituted branched C6-C22 alkyl which is selected from the group consisting of 2-ethyl-hexyl, 2-propyl-heptyl, 2-butyl-octyl, 2-pentyl-nonyl, 2-hexyl-decyl, iso-hexyl, iso-heptyl, iso-octyl, iso-nonyl, iso-decyl, iso-dodecyl, iso-tetradecyl, iso-hexadecyl, iso-octadecyl and iso-eicosyl.

In one embodiment, R is linear or branched C6-C22 alkenyl having at least one C=C double bond in any position, preferably 1 to 3 C=C double bonds, more preferably 1 or 2 C=C double bonds, most preferably 1 C=C double bond, wherein each case, each of the carbon atoms is involved not in more than 1 double bond.

Representative examples of $C_6$-$C_{22}$ alkenyl include 1-hexenyl, 2-hexenyl, 1-heptenyl, 2-heptenyl, 1-octenyl, 2-octenyl, 1-nonenyl, 2-nonenyl, 1-decenyl, 2-decenyl, 1-undecenyl, 2-undecenyl, 1-dodecenyl, 2-dodecenyl, 1-tridecenyl, 2-tridecenyl, 1-tetradecenyl, 2-tetradecenyl, 1-pentadecenyl, 2-pentadecenyl, 1-hexadecenyl, 2-hexadecenyl, 1-heptadecenyl, 2-heptadecenyl, 1-octadecenyl, 2-octadecenyl, 1-nonadecenyl, 2-nonadecenyl, 1-eicosenyl and 2-eicosenyl.

In one embodiment, n is, identical or different, 1, 2, 3 or 4; preferably n is, identical or different, 1, 2 or 3; more preferably n is, identical or different, 1 or 2; most preferably n is 1.

In another embodiment of the presently claimed invention, the modified polyetheramine comprises repeating units of formula (I), wherein
R is a linear or branched aliphatic radical containing 6 to 22 carbon atoms and 0, 1, 2 or 3 double bond(s),
$R^1$ is H,
$R^2$ is H or linear or branched C1-C6 alkyl and
n is, identical or different, an integer in the range from ≥1 to ≤4.

In another embodiment of the presently claimed invention, the modified polyetheramine comprises repeating units of formula (I), wherein
R is a linear or branched aliphatic radical containing 6 to 22 carbon atoms and 0, 1, 2 or 3 double bond(s),
$R^1$ is H or linear or branched C1-C3 alkyl,
$R^2$ is H or linear or branched C1-C6 alkyl and
n is, identical or different, an integer in the range from ≥1 to ≤3.

In another embodiment of the presently claimed invention, the modified polyetheramine comprises repeating units of formula (I), wherein
R is a linear or branched aliphatic radical containing 6 to 22 carbon atoms and 0, 1, 2 or 3 double bond(s),
$R^1$ is H or linear C1-C3 alkyl,
$R^2$ is H or linear C1-C6 alkyl and
n is, identical or different, 1 or 2.

In a further embodiment of the presently claimed invention, the modified polyetheramine comprises repeating units of formula (I), wherein
R is a linear or branched aliphatic radical containing 6 to 22 carbon atoms and 0, 1, 2 or 3 double bond(s),
$R^1$ is linear C1-C3 alkyl,
$R^2$ is H or linear C1-C6 alkyl and
n is, identical or different, 1 or 2.

Product Characteristics

In an embodiment of the presently claimed invention, the modified polyetheramine has at least one polyetheramine polyol repeating unit which has a weight average molecular weight $M_w$ in the range of ≥150 g/mol to ≤500000 g/mol, preferably in the range of ≥300 g/mol to ≤100000 g/mol, more preferably in the range of ≥500 g/mol to ≤50000 g/mol, even more preferably in the range of ≥500 g/mol to ≤30000 g/mol, most preferably in the range of ≥500 g/mol to ≤10000 g/mol, determined according to gel permeation chromatography using hexafluoroisopropanol/0.05% Trifluoroacetic acid potassium salt as mobile phase with polymethymethacrylate as standard and a refractometer as detector.

In an embodiment of the presently claimed invention, the modified polyetheramine has a weight average molecular weight $M_w$ in the range of ≥100 g/mol to ≤500000 g/mol, preferably in the range of ≥100 g/mol to ≤300000 g/mol, more preferably in the range of ≥100 g/mol to ≤200000 g/mol, even more preferably in the range of ≥100 g/mol to ≤200000 g/mol, most preferably in the range of ≥100 g/mol to ≤100000 g/mol, most preferably in the range of ≥100 g/mol to ≤70000 g/mol determined according to gel permeation chromatography using hexafluoroisopropanol/0.05% Trifluoroacetic acid potassium salt as mobile phase with polymethymethacrylate as standard and a refractometer as detector.

In an embodiment of the presently claimed invention, the at least one polyetheramine polyol has a polydispersity ($M_w/M_n$) in the range of from 1.1 to 10, determined according to gel permeation chromatography. More preferably, the at least one polyetheramine polyol has a polydispersity ($M_w/M_n$) in the range of from 1.1 to 5 determined according to gel permeation chromatography. Most preferably, the at least one polyetheramine polyol has a polydispersity ($M_w/M_n$) of 1, 1.1, 1.2, 1.3, 1.4, 1.5, 1.6, 1.7, 1.8, 1.9, 2.0, 2.5, 3.0, 3.5, 4.0, 4.5, 5 determined according to gel permeation chromatography.

Process of Synthesis

In an embodiment of the presently claimed invention, the synthesis of the modified polyetheramine is according to the below process steps, Synthesis of Branched Polyetheramine Polyol A four-neck flask equipped with stirrer, distillation bridge, gas inlet tube, and internal thermometer was charged with 1500 g triethanolamine ("TEA") and 20 g of a 50% by weight aqueous $H_3PO_2$, and the mixture so obtained was heated under nitrogen to 200° C. The reaction mixture was stirred at 200° C. over a period of 15.5 hours, during which the condensate formed in the reaction is removed by means of a moderate stream of $N_2$ as stripping gas via the distillation bridge. Toward the end of the reaction time indicated, the temperature was lowered to 140° C. and residual low molecular weight products were removed under a pressure of 100 mbar.

Then, the reaction mixture was cooled to ambient temperature, and branched polyetheramine polyol was obtained.

Esterification

In a 1 l glass reactor 600 g of oleic acid and 0.9 g of Hypophosphorous acid 50% were mixed and heated up to 60° C. Then, 276 g of branched polyetheramine polyolwere charged and the whole mixture was submitted to 50 mbar vacuum and heated up gradually to 170° C. During the heating up water from esterification reaction was distilled and vacuum was increased slowly to 10 mbar.

Whole process took 8 h and final acid value reached was 3 mg KOH/g and nitrogen content of 2.348 mq/g.

Quaternization 700 g of the ester obtained in the previous reaction were diluted with 100 g of Isopropanol in a 1 l glass reactor and heated up to 65° C. At this point 197 g of Dimethylsulfate were slowly added over 2 h. When the quaternization reaction was completed 284 g of isopropanol were added to make the product more fluid.

While there are several other methods for synthesis of the branched polyetheramine polyol which have been described in WO 2009047269, WO2009060060, WO20091112379, US20110168064.

In an embodiment of the presently claimed invention, the at least one polyetheramine polyol is a polycondensation product of at least one tri-C2-C4-alkanolamine.

In an embodiment of the presently claimed invention the tri-C2-C4-alkanolamine is selected from the group of methyldiethanolamine, triisopropylamine, monoethanolamine, diethanolamine and triethanolamine.

In a preferred embodiment of the presently claimed invention, the tri-C2-C4-alkanolamine is triethanolamine.

In an embodiment of the presently claimed invention, the at least one fatty acid is selected from compounds of the general formula (II),

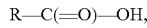

R—C(=O)—OH, wherein R is a linear or branched aliphatic radical containing 6 to 22 carbon atoms and 0, 1, 2 or 3 double bond(s).

In an embodiment of the presently claimed invention, the at least one fatty acid is selected from mixtures of fatty acids derived from triglycerides derived from natural sources such as tall oil, particularly from hydrolysis of plant derived triglycerides (fats and oils) such as soy oil, coconut oil, palm oil, palm kernel oil, linseed oil, sunflower oil, rice bran oil, grape marc oil or animal sourced fats such as tallow or butter fat, and their fractions.

In an embodiment of the presently claimed invention, the at least one fatty acid is selected from mixtures of fatty acids that are present in wholly or partially hydrogenated form.

In an embodiment of the presently claimed invention, the at least one fatty acid is selected from the group consisting of caproic acid, caprylic acid, 2-ethyl hexanoic acid, capric acid, lauric acid, isotridecanoic acid, myristic acid, palmitic acid, palmitoleic acid, stearic acid, isostearic acid, oleic acid, elaidic acid, petroselinic acid, linoleic acid, linolenic acid, eleostearic acid, arachidic acid, gadoleic acid, behenic acid and erucic acid, and mixtures of these acids.

In a preferred embodiment of the presently claimed invention, the fatty acid is selected from the group consisting of caproic acid, caprylic acid, capric acid, lauric acid, myristic acid, palmitic acid, palmitoleic acid, stearic acid, isostearic acid, oleic acid, linoleic acid, linolenic acid, arachidic acid.

In a more preferred embodiment of the presently claimed invention, the fatty acid is selected from the group consisting of stearic acid, isostearic acid, oleic acid, linoleic acid and linolenic acid.

In a more preferred embodiment of the presently claimed invention, the fatty acid is oleic acid.

Particularly preferred are also tall oil fatty acids (TOFA). Tall oil can be obtained as wood pulp side product. Tall oil comprises for example a fatty acid blend of oleic acid, linoleic acid, conjugated linoleic acid, stearic acid and for example other fatty acids and/or other components.

In an embodiment of the presently claimed invention, in case $R^1$ is linear or branched C1-C3 alkyl, the quaternization is carried out by at least one alkylating agent which is selected from the group consisting of alkyl halides, dialkyl sulfates and dialkyl carbonates.

In an embodiment of the presently claimed invention, in case $R^1$ is linear or branched C1-C3 alkyl, the quaternization is carried out by at least one alkylating agent which is selected from the group consisting of methyl chloride, dimethyl sulfate, diethyl sulfate, dimethyl carbonate and diethyl carbonate.

In a preferred embodiment of the presently claimed invention, in case R' is linear or branched C1-C3 alkyl, the quaternization is carried out by at least one alkylating agent is dimethyl sulfate.

The Flotation Processes

Reverse Flotation

In an embodiment, the presently claimed invention is directed to a reverse flotation process for the beneficiation of non-sulfidic minerals and non-sulfidic ores by collection of impurities from non-sulfidic minerals and non-sulfidic ores in the froth, comprising the steps of:
a) grinding the non-sulfidic ore to the desired particle size distribution using comminuting equipment known to specialist, such as a ball mill or a rod mill,
b) diluting the ground ore slurry with more water to obtain an aqueous mixture,
c) adjusting the pH of the aqueous mixture obtained in step b) to a desired level to obtain a pH adjusted aqueous mixture,
d) optionally, adding a depressant to the aqueous mixture,
e) adding the at least one modified polyetheramine of formula (I) to the pH adjusted aqueous mixture, f) agitating the pH adjusted aqueous mixture obtained in step e) under air injection to generate froth,
g) collecting impurities in the froth, and
h) recovering the non-sulfidic minerals from the cell product.

In an embodiment, the presently claimed invention is directed to a reverse flotation process for the beneficiation of non-sulfidic minerals and non-sulfidic ores by collection of impurities from non-sulfidic minerals and non-sulfidic ores in the froth, comprising the steps of:
a) grinding the non-sulfidic ore to the desired particle size distribution using comminuting equipment known to specialist, such as a ball mill or a rod mill,
b) diluting the ground ore slurry with more water to obtain an aqueous mixture,
c) adjusting the pH of the aqueous mixture obtained in step b) to a desired level to obtain a pH adjusted aqueous mixture,
d) optionally, adding a depressant to the aqueous mixture,
e) adding as the collector the at least one modified polyetheramine of formula (I)

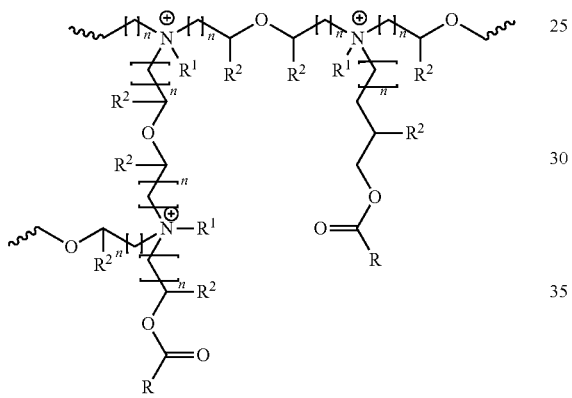

wherein
R is a linear or branched aliphatic radical containing 10 to 20 carbon atoms and 0, 1, 2 or 3 double bond(s),
$R^1$ is H or linear or branched C1-C3 alkyl,
$R^2$ is H and
n is, identical or different, an integer in the range from 1 to 2, to the pH adjusted aqueous mixture,
f) agitating the pH adjusted aqueous mixture obtained in step e) under air injection to generate froth,
g) collecting impurities in the froth, and
h) recovering the non-sulfidic minerals from the cell product.

Direct Flotation

In another embodiment, the presently claimed invention is directed to a direct flotation process for the beneficiation of non-sulfidic minerals and non-sulfidic ores comprising the steps of:
a) grinding the non-sulfidic ore to the desired particle size distribution using comminuting equipment known to specialist, such as a ball mill or a rod mill,
b) diluting the ground ore slurry with more water to obtain an aqueous mixture adjusting the pH of the aqueous mixture obtained in step a) to a desired level to obtain a pH adjusted aqueous mixture,
c) optionally, adding a depressant to the aqueous mixture,
d) adding as the collector the at least one modified polyetheramine to the pH adjusted aqueous mixture,
e) agitating the pH adjusted aqueous mixture obtained in step d) under air injection to generate froth, and
f) collecting non-sulfidic minerals in the froth.

In another embodiment, the presently claimed invention is directed to a direct flotation process for the beneficiation of non-sulfidic minerals and non-sulfidic ores comprising the steps of:
a) grinding the non-sulfidic ore to the desired particle size distribution using comminuting equipment known to specialist, such as a ball mill or a rod mill,
b) diluting the ground ore slurry with more water to obtain an aqueous mixture adjusting the pH of the aqueous mixture obtained in step a) to a desired level to obtain a pH adjusted aqueous mixture,
c) optionally, adding a depressant to the aqueous mixture,
d) adding as the collector the at least one modified polyetheramine of formula (I)

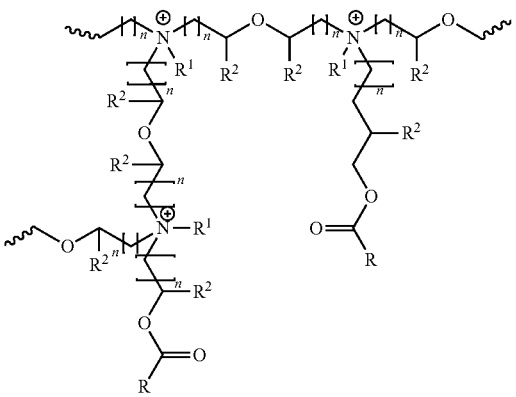

wherein
R is a linear or branched aliphatic radical containing 10 to 20 carbon atoms and 0, 1, 2 or 3 double bond(s),
$R^1$ is H or linear or branched C1-C3 alkyl,
$R^2$ is H and
n is, identical or different, an integer in the range from $\geq 1$ to $\leq 2$.
to the pH adjusted aqueous mixture,
e) agitating the pH adjusted aqueous mixture obtained in step d) under air injection to generate froth, and
f) collecting non-sulfidic minerals in the froth.

Minerals

An embodiment of the presently claimed invention relates to a method for reverse froth flotation for non-sulfidic ores containing silicate as impurities, especially phosphate ores for the recovery of apatite minerals, in which method the compound or composition described above is used as a collector. In the context of the present invention, the term "non-sulfidic ore" means ores where the value mineral is not in the form of a sulphide, and includes any ore that is conventionally classified as non-sulfidic, inter alia barite, calamine, calcite, magnesite, cassiterite, coal, feldspar, pyrochlore, fluorite, glass sand, graphite, heavy metal oxides, iron ores, kaolin clay, phosphate, mica, potash, pyrochlore, quartz, silicates, scheelite and talc.

In an embodiment of the presently claimed invention, the non-sulfidic ore is selected from the group consisting of iron ores, phosphate ores, calcite, pyrochlore, quartz, kaolin, mica, feldspar and other silicates.

In another preferred embodiment of the presently claimed invention, the amount of the collector composition is in the range of 10 g to 10 Kg per 1000 kg non-sulfidic minerals and non-sulfidic ores; more preferably 10 g to 8 kg per 1000 kg non-sulfidic minerals and non-sulfidic ores; even more preferably 50 g to 5 kg per 1000 kg non-sulfidic minerals and non-sulfidic ores; most preferably 50 g to 3 kg per 1000 kg non-sulfidic minerals and non-sulfidic ores; and in particular preferably 50 g to 1 kg per 1000 kg non-sulfidic minerals and non-sulfidic ores.

Auxiliary Agents

In a preferred embodiment of the presently claimed invention, the flotation process, both direct and reverse, comprises the step of adding one or more modifiers and/or one or more frothers and/or one or more depressants before step.

In another preferred embodiment of the presently claimed invention, the modifiers are selected from the group consisting of pH modifiers such as sulfuric acid, phosphoric acid, hydrochloric acid, hexafluorosilicic acid, ammonia, sodium hydroxide, sodium carbonate.

In another preferred embodiment of the presently claimed invention, the depressants/dispersants are selected from the group consisting of sodium silicate, potassium silicate, sodium polyacrylate, sodium (di)hydrogenphosphate, sodium pyrophosphate, sodium metapolyphosphate, starch (straight or gelatinized with NaOH), other natural polysaccharides such as guar gum, dextrin, lignine sulfonate, natural tannins e.g. quebracho extract, sulfonated tannins, poly(ethylene)oxides etc.

In another preferred embodiment of the presently claimed invention, the frothers are selected from the group consisting of pine oil, aliphatic alcohols such as MIBC (methyl isobutyl carbinol), polyglycols, polyglycol ethers, polypropylene glycol ethers, polyoxyparafins, cresylic acid (Xylenol), distillate bottoms of 2-ethyl hexanol, 2 ethyl hexanol, n-butanol, 2-methyl-2-butanol, isononyl alcohol, isodecyl alcohol, by products of hydroformylation of propene and mixtures thereof; More preferably, the frothing agent is MIBC (methyl isobutyl carbinol), polyglycols, polyglycol ethers, polypropylene glycol ethers, 2-ethylhexanol, distillate bottoms of 2-ethyl hexanol.

In another preferred embodiment of the presently claimed invention, the depressants are selected from the group consisting of poly(ethylene) oxide, polycarboxylate ethers, sodium polyacrylate, polysaccharides, starch, cellulose derivatives, and tannic acid.

In the following, there is provided a list of embodiments to further illustrate the present disclosure without intending to limit the disclosure to the specific embodiments listed below.

EMBODIMENTS

1. A modified polyetheramine comprising repeating units of formula (I),

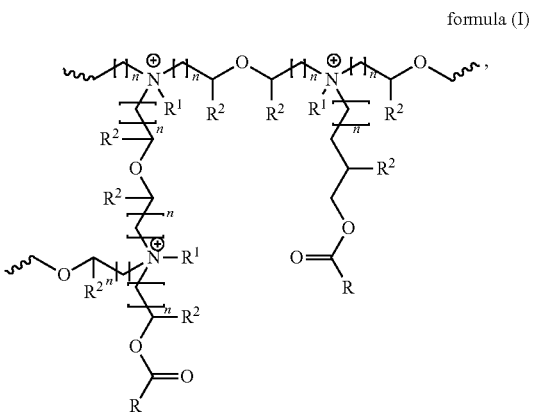

formula (I)

wherein,
R is a linear or branched aliphatic radical containing 6 to 22 carbon atoms and 0, 1, 2 or 3 double bond(s),
$R^1$ is H or linear or branched C1-C3 alkyl,
$R^2$ is H or linear or branched C1-C6 alkyl and
n is, identical or different, an integer in the range from ≥1 to ≤4.

2. The modified polyetheramine according to embodiment 1, wherein R is a linear aliphatic radical containing 10 to 20 carbon atoms and 0, 1, 2 or 3 double bond(s), $R^1$ is H or linear or branched C1-C3 alkyl, $R^2$ is H or linear or branched C1-C6 alkyl, and n is, identical or different, 1 or 2.

3. The modified polyetheramine according to embodiment 1 or 2, wherein R is a linear aliphatic radical containing 10 to 20 carbon atoms and 0, 1 or 2 double bond(s), $R^1$ is H or linear C1-C3 alkyl, $R^2$ is H or linear C1-C3 alkyl, and n is, identical or different, 1 or 2.

4. The modified polyetheramine according to any of the embodiments 1 to 3, wherein R is a linear aliphatic radical containing 10 to 20 carbon atoms and 0, 1 or 2 double bond(s) and $R^1$ is methyl, $R^2$ is H and n is 1.

5. The modified polyetheramine according to any of the embodiments 1 to 4, wherein the modified polyetheramine polyol has a weight average molecular weight $M_w$ in the range of ≥1000 g/mol to ≤500000 g/mol, determined via Gel permeation Chromatography.

6. The modified polyetheramine according to any of the embodiments 1 to 5, wherein the at least one modified polyetheramine comprising repeating units of formula (I) is obtained by
reacting at least one polyetheramine polyol containing at least one hydroxyl group with at least one fatty acid and further modifying by quaternization with at least one $C_1$-$C_3$ alkyl group.

7. The modified polyetheramine according to embodiment 6, wherein the at least one polyetheramine polyol is at least one branched polyetheramine polyol.

8. The modified polyetheramine according to embodiment 6 or 7, wherein the repeating unit of the at least one polyetheramine polyol has a weight average molecular weight $M_w$ in the range of ≥100 g/mol to ≤50000 g/mol, determined according to gel permeation chromatography.

9. The modified polyetheramine according to any of the embodiments 6 to 8, wherein the at least one polyetheramine polyol has a polydispersity ($M_w/M_n$) in the range of from 1.1 to 5, determined according to gel permeation chromatography 10. The modified polyetheramine according to any of the embodiments 6 to 9, wherein the at least one polyetheramine polyol has a hydroxyl number in the range of ≥100 mg KOH/g to ≤1000 mg KOH/g.

11. The modified polyetheramine according to any of the embodiments 6 to 10, wherein the at least one polyetheramine polyol is a polycondensation product of at least one tri-C2-C4-alkanolamine.

12. The modified polyetheramine according to embodiment 11, wherein the at least one tri-C2-C4-alkanolamine is triethanolamine.

13. The modified polyetheramine according to any of the embodiments 6 to 12, wherein the at least one fatty acid is selected from compounds of the general formula (II),

R—C(=O)—OH, wherein R is a linear or branched aliphatic radical embodiments 6 to 22 carbon atoms and 0, 1, 2 or 3 double bond(s).

14. The modified polyetheramine according to any of the embodiments 6 to 13, wherein the at least one fatty acid is selected from the group consisting of a mixture of fatty acids derived from natural oils and fats, wholly or partially hydrogenated fatty acids, purified fatty acids and synthetic fatty acids.

15. The modified polyetheramine according to any of the embodiments 6 to 14, wherein the at least one fatty acid is selected from mixtures of fatty acids derived from triglycerides derived from natural sources such as tall oil, particularly from hydrolysis of plant derived triglycerides (fats and oils) such as soy oil, coconut oil, palm oil, palm kernel oil, linseed oil, sunflower oil, rice bran oil, grape marc oil or animal sourced fats such as tallow or butter fat, and their fractions.

16. The modified polyetheramine according to embodiment 15, wherein the at least one fatty acid is selected from mixtures of fatty acids that are present in wholly or partially hydrogenated form.

17. The modified polyetheramine according to any of the embodiments 6 to 16, wherein the at least one fatty acid is selected from the group consisting of caproic acid, caprylic acid, 2-ethyl hexanoic acid, capric acid, lauric acid, isotridecanoic acid, myristic acid, palmitic acid, palmitoleic acid, stearic acid, isostearic acid, oleic acid, elaidic acid, petroselinic acid, linoleic acid, linolenic acid, eleostearic acid, arachidic acid, gadoleic acid, behenic acid and erucic acid.

18. The modified polyetheramine according to any of the embodiments 6 to 17, wherein the quaternization is carried out by at least one alkylating agent selected from the group of alkyl halides, dialkyl sulfates and dialkyl carbonates.

19. The modified polyetheramine according to embodiment 18, wherein the at least one alkylating agent is selected from the group consisting of methyl chloride, dimethyl sulfate, diethyl sulfate, dimethyl carbonate and diethyl carbonate.

20. The modified polyetheramine according to any of the embodiments 6 to 19, wherein the molar ratio of hydroxyl groups in the at least one polyetheramine polyol to the carboxyl group of the at least one fatty acid is in the range of ≥0.7 to ≤1.0

21. The modified polyetheramine according to any of the embodiments 6 to 20, wherein the at least one modified polyetheramine is obtained by (a) polycondensation of at least one tri-C2-C4-alkanolamine to form a branched polyetheramine polyol,
(b) esterification of the branched polyetheramine polyol with at least one fatty acid, and
(c) quaternization with at least one alkylating agent.

22. The modified polyetheramine according to embodiment 21, wherein the at least one fatty acid is oleic acid.

23. The modified polyetheramine according to embodiment 21, wherein the at least one alkylating agent is dimethyl sulfate.

24. Use of the at least one modified polyetheramine according to any of embodiments 1 to 23 as a collector in the beneficiation process of non-sulfidic minerals and non-sulfidic ores.

25. The use according embodiment 24, wherein the non-sulfidic minerals and non-sulfidic ores are selected from the group consisting of iron ores, phosphate ores, calcite, quartz, kaolin, mica, felspar and silicates.

26. The use according to embodiment 24, wherein the non-sulfidic mineral is calcite.

27. A reverse flotation process for the beneficiation of non-sulfidic minerals and non-sulfidic ores by collection of impurities from non-sulfidic minerals and non-sulfidic ores in the froth, comprising the steps of:

a) grinding the non-sulfidic ore to the desired particle size distribution using comminuting equipment known to specialist, such as a ball mill or a rod mill,
b) diluting the ore slurry with further water to obtain an aqueous mixture,
c) adjusting the pH of the aqueous mixture obtained in step b) to a desired level to obtain a pH adjusted aqueous mixture,
d) optionally, adding a depressant to the aqueous mixture,
e) adding the at least one modified polyetheramine according to any of the claims 1 to 23 to the pH adjusted aqueous mixture,
f) agitating the pH adjusted aqueous mixture obtained in step e) under air injection to generate froth,
g) collecting impurities in the froth, and
h) recovering the non-sulfidic minerals in the cell product.

28. The method according to embodiment 27, wherein the at least one modified polyetheramine is added in an amount of ≥50 g/1000 kg to ≤2000 g/1000 kg, based on the total weight of the non-sulfidic minerals or non-sulfidic ores.

29. The method according to embodiment 27, wherein the non-sulfidic mineral is calcite.

While the presently claimed invention has been described in terms of its specific embodiments, certain modifications and equivalents will be apparent to those skilled in the art and are intended to be included within the scope of the presently claimed invention

EXAMPLES

The presently claimed invention is illustrated in detail by non-restrictive working examples which follow. More particularly, the test methods specified hereinafter are part of the general disclosure of the application and are not restricted to the specific working examples.

Example 1

Synthesis of the Collector
Synthesis of Branched Polyetheramine Polyol

A four-neck flask equipped with stirrer, distillation bridge, gas inlet tube, and internal thermometer was charged with 1500 g triethanolamine ("TEA") and 20 g of a 50% by weight aqueous $H_3PO_2$, and the mixture so obtained was heated under nitrogen to 200° C. The reaction mixture was stirred at 200° C. over a period of 15.5 hours, during which the condensate formed in the reaction is removed by means of a moderate stream of $N_2$ as stripping gas via the distillation bridge. Toward the end of the reaction time indicated, the temperature was lowered to 140° C. and residual low molecular weight products were removed under a pressure of 100 mbar.

The reaction mixture was cooled to ambient temperature to obtain branched polyetheramine polyol was obtained.

$M_n$=4935 g/mol, $M_w$=8130 g/mol
$M_w/M_n$=1.6
OH number: 620 mg KOH/g
Amine number: 431 mg KOH/g
Hazen colour number=363 APHA
Dynamic viscosity at 60° C.: 431 mPa·s OH numbers were measured according to DIN 53240, part 2.

$M_n$, Mw and $Mw/M_n$ were determined according to gel permeation chromatography using hexafluoroisopropanol/ 0.05% Trifluoroacetic acid potassium salt as mobile phase with polymethymethacrylate as standard and a refractometer as detector.

Esterification

In a 1 l glass reactor 600 g of oleic acid and 0.9 g of hypophosphorous acid 50% were mixed and heated up to 60° C. Then, 276 g of Lupasol EO were charged and the whole mixture was submitted to 50 mbar vacuum and heated up gradually to 170° C. During the heating up water from esterification reaction was distilled and vacuum was increased slowly to 10 mbar.

Whole process took 8 h and final acid value reached was 3 mg KOH/g and nitrogen content of 2.348 mq/g.

Quaternization 700 g of the ester obtained in the previous reaction were diluted with 100 g of Isopropanol in a 1 l glass reactor and heated up to 65° C. At this point 197 g of dimethylsulfate were slowly added over 2 h. When the quaternization reaction was completed 284 g of isopropanol were added to make the product more fluid.

Example 2

Molecular Weight Determination

The molecular weight was determined using the gel permeation chromatography.

Solvent: Hexafluoroisopropanol (HFIP)
Sample Preparation:

12.4 mg sample was dissolved in 4 ml eluent (HFIP+0.05 w % Trifluoro ammonium acetate) over night. AH sample solutions were filtered by a Millipore Millex FG (0.2 μm) filtered prior to injection. Sealed sample vials were placed into the auto sampler.

Experimental Conditions:

An Agilent 1200 HPLC system, consisting of an isocratic pump, vacuum degasser, auto sampler and a column oven was used. Furthermore, contains the Agilent system as detectors a Differential Refractive Index (DRI) and a variable Ultra Violet (UVW) Detector. Data acquisition and data processing of conventionally SEC data were done by Win G PC Unichrom 8.31, build 8485, of PSS (Polymer Standard Services). A combination of four PL Mixed Bed A columns (7.5×300 mm, 200 of Agilent were put in series. As an eluent, Hexafluorisopropanol+0.05 w % Trifluoro ammonium acetate was used as a flow rate of 1 mL/min. Of each sample solution 100 μL was injected. The calibration was obtained by narrow molar mass distributed PMMA standards (Polymer Standard Services) having a molar mass range of M=800 till M=2200000 g/mol. Molar masses outside this range were extrapolated.

Molecular Weight of the Quaternized Polyetheramine $M_w$=49200 g/mol

Example 3

Flotation Process

Materials:

Collector 1: Lupromin® FP 18 AS—a polymeric cationic collector which is available from BASF and is prepared by esterification of triethanolamine, oleic acid and adipic acid in a molar ratio of appr. 1:1:1, using hypophosphoric acid and constantly removing water by distillation, and a subsequent quaternization step using dimethylsulfate in a molar ratio of 0.97 mol DMS per mol triethanol amine used in step 1

Collector 2: Modified polyetheramine of formula (I) according to example 1

Frother: None

Flotation cell: Denver flotation cell

Carbonate rock from a Central European mining site containing ~5% $SiO_2$ and minor colored impurities was ground to 100%<80 μm. The slurry with 25% solids was transferred into a Denver flotation machine with 2.5 L cell, conditioned with collector, added as 10% aqueous solution (dosage see table) for 1 min, and floated to completion. Subsequently, half the initial collector amount was added again, and the flotation repeated. The combined froth fractions and the cell fraction were dewatered, dried and weighed, then analyzed for calcite, acid insoluble content and whiteness (Tappi method). The results are presented in Table 1

| Collector | Dosage (g/t) | Acid insoluble in conc. | $CaCO_3$ loss in tail | Whiteness |
|---|---|---|---|---|
| Lupromin ® FP 18 AS | 200 + 100 | 2.96 | 3.2 | 90.31 |
| | 300 + 150 | 1.55 | 2.2 | 92.18 |
| | 400 + 200 | 0.58 | 8.1 | 93.70 |
| Modified polyetheramine | 200 + 100 | 1.71 | 3.9 | 90.59 |
| | 300 + 150 | 1.02 | 4.4 | 91.54 |
| | 400 + 200 | 0.24 | 5.0 | 93.28 |

The invention claimed is:

1. A modified polyetheramine comprising repeating units of formula (I),

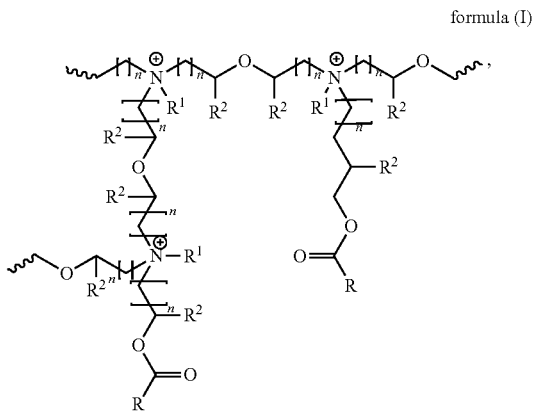

formula (I)

wherein,
R is a linear or branched aliphatic radical containing 6 to 22 carbon atoms and 0, 1, 2 or 3 double bond(s),
$R^1$ is H or linear or branched C1-C3 alkyl,
$R^2$ is H or linear or branched C1-C6 alkyl and
n is, identical or different, an integer in the range from ≥1 to ≤ 4.

2. The modified polyetheramine according to claim 1, wherein R is a linear aliphatic radical containing 10 to 20 carbon atoms and 0, 1 or 2 double bond(s), $R^1$ is H or linear C1-C3 alkyl, $R^2$ is H or linear C1-C3 alkyl, and n is, identical or different, 1 or 2.

3. The modified polyetheramine according to claim 1, wherein R is a linear aliphatic radical containing 10 to 20 carbon atoms and 0, 1 or 2 double bond(s) and $R^1$ is methyl, $R^2$ is H and n is 1.

4. The modified polyetheramine according to claim 1, wherein the modified polyetheramine polyol has a weight average molecular weight $M^w$ in the range of ≥1000 g/mol to ≤500000 g/mol, determined via Gel permeation Chromatography.

5. The modified polyetheramine according to claim 1, wherein the at least one modified polyetheramine comprising repeating units of formula (I) is obtained by reacting at least one polyetheramine polyol containing at least one hydroxyl group with at least one fatty acid and further modifying by quaternization with at least one hydrogen or $C_1$-$C_3$ alkyl group.

6. The modified polyetheramine according to claim 5, wherein the at least one polyetheramine polyol is at least one branched polyetheramine polyol.

7. The modified polyetheramine according to claim 5, wherein the at least one polyetheramine polyol has a polydispersity ($M_w/M_n$) in the range of from 1.1 to 5, determined according to gel permeation chromatography.

8. The modified polyetheramine according to claim 5, wherein the at least one polyetheramine polyol is a polycondensation product of at least one tri-C2-C4-alkanolamine.

9. The modified polyetheramine according to claim 5, wherein the at least one fatty acid is selected from compounds of the general formula (II),
R—C(=O)—OH,
wherein R is a linear or branched aliphatic radical containing 6 to 22 carbon atoms and 0, 1, 2 or 3 double bond(s).

10. The modified polyetheramine according to claim 5, wherein the quaternization is carried out by at least one alkylating agent selected from the group of alkyl halides, dialkyl sulfates and dialkyl carbonates.

11. A method of using the polyetheramine according to claim 1 as a collector in a beneficiation process of non-sulfidic minerals and non-sulfidic ores.

12. The method according to claim 11, wherein the non-sulfidic minerals and non-sulfidic ores are selected from the group consisting of iron ores, phosphate ores, calcite, quartz, kaolin, mica, felspar and silicates.

13. The method according to claim 12, wherein the non-sulfidic mineral is calcite.

14. A reverse flotation process for the beneficiation of non-sulfidic minerals and non-sulfidic ores by collection of impurities from non-sulfidic minerals and non- sulfidic ores in the froth, comprising:
a) grinding the non-sulfidic ore to the desired particle size distribution using comminuting equipment known to specialist, such as a ball mill or a rod mill
b) Diluting the ground slurry with further water to obtain an aqueous mixture,
c) adjusting the pH of the aqueous mixture obtained in step-b) to a desired level to obtain a pH adjusted aqueous mixture,
d) optionally, adding a depressant to the aqueous mixture,
e) adding the at least one modified polyetheramine according to claim 1 to the pH adjusted aqueous mixture,
f) agitating the pH adjusted aqueous mixture obtained in under air injection to generate froth,
g) collecting impurities in the froth, and
h) recovering the desired non-sulfidic minerals in the cell product.

15. The method according to claim 14, wherein the at least one modified polyetheramine is added in an amount of ≥50 g/1000 kg to ≤2000 g/1000 kg, based on the total weight of the non-sulfidic mineral or non-sulfidic ores.

* * * * *